Jan. 7, 1941.  F. TOOP  2,227,950
SELECTIVE, ADJUSTABLE, NONDISTORTION WORK SHELF SHEARS
Filed Jan. 18, 1939
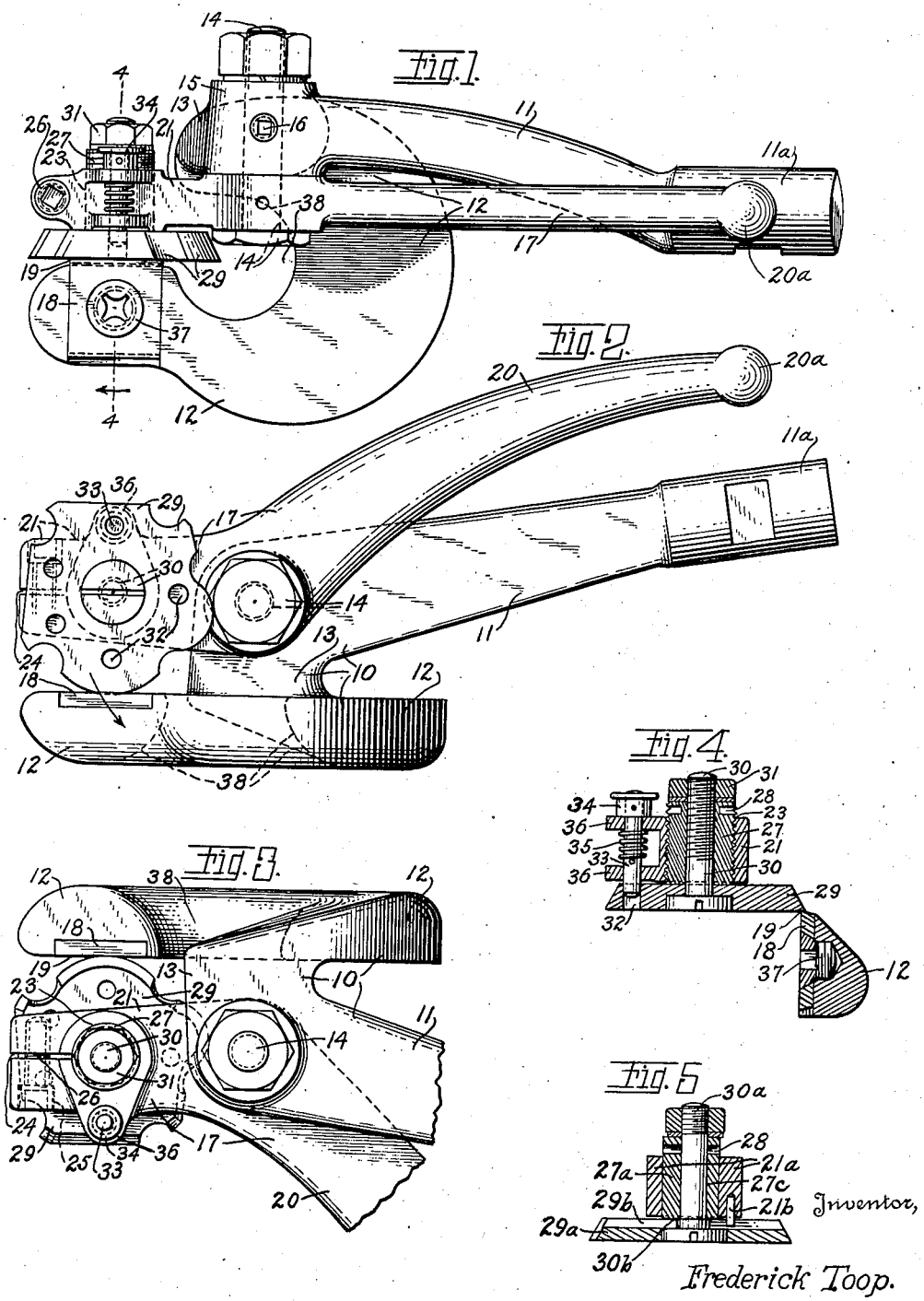
Inventor,
Frederick Toop.
By Sterling P. Buck,
Attorney.

Patented Jan. 7, 1941

2,227,950

UNITED STATES PATENT OFFICE 2,227,950

SELECTIVE, ADJUSTABLE, NONDISTORTION WORK SHELF SHEARS

Frederick Toop, York, Pa., assignor to Petco, Inc., York, Pa., a corporation of Delaware Application January 18, 1939, Serial No. 251,625

10 Claims. (Cl. 30—244)

This invention relates to a shearing attachment for a portable power producing and transmitting unit of the type disclosed in my pending application No. 223,807, filed Aug. 9, 1938, and has certain features of similarity to the two-unit work shelf shears disclosed in my pending application No. 217,912, filed July 7, 1938; but in view of certain improvements, presently disclosed, this invention is given the title, Selective, adjustable, nondistortion work shelf shears.

One object of this invention is to provide an improved form of nondistortion work shelf that has a capacious opening in rear, at right and at left of the shearing edges, so the sheared parts of a sheet or strip do not touch the work shelf until they have passed a considerable distance rearward from the shearing edges, therefore, are not distorted beyond their elastic limit, resulting in smooth edges of the sheared sheet metal or other material that has even a slight degree of elasticity.

Another object is to provide a simple and thoroughly practical supporting and adjusting mechanism by which the upper shearing blade can be adjusted rotatively and held in the different adjusted positions for selectively positioning the several distinctly different shapes of shearing edge-portions of the upper blade in cooperative relation with the lower shearing edge, so as to enable the user to perform the different kinds of shearing encountered in cutting out or trimming off sheet metal or the like so as to form various angles, arcs, straight edges and zigzags, etc., without the necessity of using interchangeable shearing tools or blades for such various kinds of shearing.

Another object is to provide, in a simple and very practical blade-supporting mechanism, a means for quickly, easily and conveniently adjusting the upper shearing blade toward the lower shearing blade, so as to obviate the necessity of very accurate machining or grinding in the manufacture of these devices, and so as to compensate for wearing and re-sharpening of the shearing edges after they have been dulled by continual use.

Another object is to provide a simple, very practical and effective means to easily and quickly adjust the upper shearing blade upward and downward or across the lower shearing edge so as to compensate for slight variations in the manufacture of these devices, and to compensate for the wearing and/or grinding away of the shearing edge-portions of the upper shearing blade.

Another object is to provide an improved form of rotary shearing blade, the same having a series of distinctly different shearing edge-portions each movable selectively into cooperative shearing relation with the lower shearing blade, these different edge-portions being designed, respectively; for straight and fast shearing; for forward and backward shearing along straight, arcuate, angular or zigzag lines; for "nibbling" in comparatively heavy or tough metal etc.; such blade having inherent therein a part of the means for securing it in its different adjustments.

Another object is to provide a modified form of blade-adjusting mechanism that enables the blade to be held against rotation while being adjusted both or either vertically and/or horizontally, and which enables the blade to be released for rotation or reversal when desirable.

Other objects and important features are pointed out or implied in the following details of description, in connection with accompanying drawing in which:

Fig. 1 is a top plan view of a shearing device embodied in the present invention.

Fig. 2 is a left-side elevation thereof, the curved arrow showing the direction of motion of the upper shearing blade across the lower shearing edge.

Fig. 3 is an elevation of the main portion of the device inverted so as to show the side that is normally to the right and to more fully show the normally under side of the work shelf.

Fig. 4 is a sectional view along the line 4—4 of Fig. 1; and

Fig. 5 is a view similar to Fig. 4, but showing a modified form of upper shearing blade and its supporting and adjusting mechanism.

Referring to this drawing in detail, in which, similar reference numerals refer to similar parts in the several views, the invention is described in detail as follows:

The lower or basal unit 10 includes an attaching or supporting arm 11, a work shelf 12, and a spacing element 13, all formed integrally of any appropriate metal or other material, and also includes the pivot or screw-bolt 14 which is normally fixed to the pivot-bearing 15 by any appropriate means, for instance, a socket-screw or set-screw 16. This pivot is provided for pivotally connecting the upper unit or operating lever 17 to the lower unit, and the latter also includes a shearing edge, viz., either one of the sharp opposite edges of the lower shearing blade 18, the latter secured reversibly or interchangeably in place by a screw or other appropriate means, the operatively positioned lower shearing edge being shown at 19.

The upper or supplemental unit or operating lever 17 includes a long rear arm 20 and a short front arm 21, the latter including parts of a blade-supporting and blade-adjusting mechanism presently described. This arm 21 is formed with a cylindrical internally screw-threaded opening 23, a slot 24 that extends from the free end of the arm into the opening 23, an internally screw-threaded bore 25 that passes through the slot 24 and receives a screw 26, the latter being effective to draw the furcations of the arm 21 toward one another so as to form a clamp that clamps the tubular cylinder 27 in its different adjusted positions. This externally threaded cylinder has spanner-cavities 28 therein, so when the screw 26 is loosened to relieve the clamping action on the cylinder 27, the latter can be turned in the bearing or opening 23 for screwing it inward or outward very slightly from the position shown in Fig. 4, to relieve or increase pressure of the blade 29 against the blade 18; then, when properly adjusted, the screw 26 can be tightened for clamping the cylinder 27 in its adjusted position. In Fig. 4, it is shown that the blade 29 is seated against one end of the cylinder 27, being held there by its pivot which is in the form of a screw 30 having a nut 31 thereon; so the units 27, 30 and 31 are combined to form a clamp or shearing-blade-connector that holds the shearing blade 29 firmly in place; while the bifurcated arm and screw 26 are combined to form a clamp that secures the unit 27 in its different adjustments. The purpose of the pivot 30 is to permit the selective shearing blade 29 to be turned for moving each or any of the distinctive shearing edge-portions into cooperative relation with the shearing edge 19 so as to accomplish one of the objects stated hereinbefore; and to assure that each one of these shearing edge-portions is positioned and secured in the proper or best relation to the shearing edge 19 when selected for use, the blade 29 is provided with a circular arrangement of openings 32 to receive (alternatively) an end of a spring-pressed plunger or detent 33 which has a manipulative head 34 by which it can be drawn out of the respective openings 32 against the yielding resistance of the spring 35. Bearings 36 are provided on the upper furcation of the arm 21, and the spring-pressed detent 33 is slidable therein for engagement and disengagement with the respective openings 32 whose walls combine with the elements 33, 35 and 36 as a detaining means for securing the shearing blade 29 in its different selective positions; but it should be understood that the nut 31 must be loosened to permit the blade 29 to be turned, unless the screw 30 is provided with a shoulder at 30b as shown on the screw-pivot 30a in Fig. 5, such shoulder bearing hard against the cylinder 27 or 27a to relieve pressure between the cylinder and the blade 29 or 29a and permit the blade to turn around the pivot, or to permit the pivot to turn within the central bearing of the blade as in Fig. 5.

Now, referring more in detail to the modified form in Fig. 5, it is seen that the blade 29a has a groove or channel 29b that may extend either entirely thereacross, or only part-way thereacross and which receives a pin or stud 21b that is united with the arm 21a which arm is bifurcated and provided with a screw to form a clamp such as the clamp 21—26 of the form shown in Figs. 1 to 4 inclusive; but the arm 21a eliminates the bearings 36 and the screw-thread of the opening or bearing 23; so, in the modified form, the cylinder 27a is susceptible of rotary movement and axial movement independent of one another, so it can be adjusted rotatively and/or axially by simple manipulation when the clamp is loosened therearound, or adjusted by means of a spanner while the clamp exerts slight pressure thereon, spanner-holes 28 being provided therein. The pivot-bearing or opening 27c is excentric to the axis of rotation of the cylinder 27a; so, when the latter is rotated, it adjusts the blade 29a in any desired radial direction with respect to the said axis of rotation, the purpose of such adjustment being to compensate for wearing and grinding away the periphery or shearing edge portions; and the purpose of axial adjustment being to increase or reduce the pressure against the shearing edge on the basal member or unit 10. If the blade 29a is circular, as the one shown in my patent application No. 216,739, the pin-and-slot connection 21b—29b may be eliminated; or, if such blade is of the selective form shown herein at 29, it may be provided with radial slots 29b for the respective differently shaped edge portions, in lieu of the holes 32, and the spring-pressed detent 33 may replace the pin or stud 21b; so it is evident that the blade-adjusting mechanism is susceptible of various modifications by use of the elements shown herein and by use of equivalents of such elements.

Referring again to the work shelf 12, it is seen that the lower shearing blade is removably secured in place by a socket-screw 37 and can be reversed for interchanging the shearing edges. It is also seen that a capacious opening 38 is provided in the work shelf, this opening being immediately in rear of the shearing edge 19 and extending a considerable distance to rear, to right and to left of the shearing edge 19; so, as a sheet or strip of metal is being sheared by the blades in cooperation, the parts of metal or material that have passed a considerable distance in rear of the blades are out of contact with the work shelf, and this is true whether the shearing is effected along straight, angular or arcuate lines, because the clearance is at both sides as well as in rear of the blades. Even when the severed parts of the sheet or strip have passed rearward beyond the upper part of the opening 38, they are still out of contact with the work shelf because the opening 38 is downwardly flared so it is much more capacious at its lower end than at its upper end, as is clearly shown by the broken lines at 38 in Fig. 2.

The cylindrical slabbed end 11a of the arm 11 and the globular end 20a of the arm 20 are adapted for attachment to the power applying device previously referred to, for supporting and operating these arms with respect to one another so as to effect shearing operation of the blades 18 and 29.

It is not my intention to limit my patent protection to these forms of the invention as shown and described, for the invention is susceptible of numerous changes within the scope of the inventive ideas as implied and claimed.

What I claim as my invention is:

1. In a shearing mechanism, the combination of a basal unit that includes a shearing edge, a supplemental unit movably secured to said basal unit and including a clamp, a shearing blade, and a shearing-blade-connector normally clamped in said clamp and having said shearing blade mounted thereon and movable therewith when the clamp is loosened so as to adjust said shearing blade to a proper cooperative shearing correlation with the said shearing edge of said basal unit.

2. In a shearing mechanism, the combination of a basal unit that includes a shearing edge, a supplemental unit movably secured to said basal unit and provided with a pivot, a shearing blade including distinctly different shearing edge-portions and being journaled on said pivot in the proper relation to permit said shearing edge-portions to be selectively disposed in cooperative shearing relation with said shearing edge of the basal unit, and means combined with said pivot for clamping said shearing blade for preventing or helping to prevent accidental rotary movement of the shearing blade on its pivot, the last said means including an adjustable element to which said pivot is connected, said supplemental unit being inclusive of a clamp in which the said adjustable element is normally clamped for preventing accidental movement of the adjustable element, said adjustable element being movable in the axial direction of the said pivot when said clamp is loosened, for purposes specified.

3. The combination defined by claim 1, said shearing blade connector being inclusive of a substantially cylindrical externally screw-threaded member, said clamp being internally screw-threaded and interengaged with the screw-threads of said externally screw-threaded member so it can be turned when unclamped and thereby effect fine adjustments in the axial direction of the said screw-threaded member.

4. The combination defined by claim 1, said shearing-blade-connector being inclusive of a substantially cylindrical element mounted for axial movement and rotary movement in said clamp when the latter is loosened, said cylindrical element being provided with an excentrically disposed pivot on which the said shearing blade is mounted for rotation at will of the user, whereby the said shearing blade can be adjusted in axial and radial directions with respect to the axis of said cylindrical element for properly placing the shearing blade in correlation with said shearing edge.

5. The combination defined by claim 1, said shearing-blade-connector being inclusive of a substantially cylindrical element having a substantially smooth peripheral surface and being free for axial sliding movement in the clamp when the latter is loosened and also free for rotary movement independently of the axial movement, whereby, said shearing blade can be adjusted with respect to its pressure against said shearing edge of the basal unit and also adjusted laterally of said shearing edge.

6. The combination defined by claim 1, said shearing-blade-connector being inclusive of a cylindrical element having thereon an excentrically located pivot on which said shearing blade is journaled for rotation of the pivot therein when the cylinder is rotated by the user while the clamp is loosened, said supplemental unit and shearing blade being provided with a pin-and-slot connection for holding or securing the shearing blade against rotary movement with respect to said supplemental unit while the cylinder is being rotated and thereby adjusting the position of said excentrically located pivot for effecting adjustment of said shearing blade across the shearing edge of said basal unit.

7. In an adjusting mechanism for a shearing blade which is provided with a pivot, the combination with said blade and pivot, of a cylindrical unit with which said pivot is connected in an excentric position with respect to the axis of said cylindrical unit, a bearing in which said cylindrical unit is seated for rotary and axial movements so as to permit said shearing blade to be adjusted both radially and axially with respect to the axis of said cylindrical unit, and means to cooperate with said bearing and cylindrical unit for securing said shearing blade against accidental movement with respect to said cylindrical unit.

8. The structure defined by claim 1, the said shearing-blade-connector being inclusive of means to clamp said shearing blade in different adjusted positions thereon, the said means being releasable for permitting the shearing blade to be adjusted to different positions.

9. In a shearing mechanism, the combination of a basal unit that includes a shearing edge, a supplemental unit movably secured to said basal unit and including a clamp, a shearing blade, and a shearing-blade-connector normally clamped in said clamp and having said shearing blade mounted thereon and movable therewith when the clamp is loosened so as to adjust said shearing blade to a proper cooperative shearing correlation with said shearing edge of said basal unit, said shearing blade being inclusive of distinctly different shearing edge-portions and being journaled on said shearing-blade-connector in the proper relation to permit said shearing edge portions to be selectively placed in cooperative shearing relation with said shearing edge of the basal unit, also to permit each of the different shearing edge portions to be adjusted with respect to said shearing edge by movement of said shearing-blade-connector.

10. In a shearing mechanism, the combination of a basal unit that includes a shearing edge, a supplemental unit movably secured to said basal unit and provided with a pivot, a shearing blade including distinctly different shearing edge-portions and being journaled on said pivot in the proper relation to permit said shearing edge-portions to be selectively disposed in cooperative shearing relation with said shearing edge of said basal unit, and spring-pressed detaining means normally engaged with said shearing blade for securing said shearing blade in its different selected positions, said spring-pressed detaining means being provided with a manipulative element for effecting its disengagement from said shearing blade at will of the user.

FREDERICK TOOP.